(12) United States Patent
Hwang et al.

(10) Patent No.: US 6,956,948 B1
(45) Date of Patent: Oct. 18, 2005

(54) APPARATUS AND METHOD FOR GENERATING MULTIPLE SCRAMBLING CODES IN ASYNCHRONOUS MOBILE COMMUNICATION SYSTEM

(75) Inventors: Sung-Oh Hwang, Yongin-shi (KR); Hee-Won Kang, Seoul (KR); Hyun-Woo Lee, Suwon-shi (KR)

(73) Assignee: Samsung Electronics Co., Ltd., (KR)

( * ) Notice: Subject to any disclaimer, the term of this patent is extended or adjusted under 35 U.S.C. 154(b) by 886 days.

(21) Appl. No.: 09/667,350

(22) Filed: Sep. 22, 2000

(30) Foreign Application Priority Data

Sep. 22, 1999 (KR) ............................... 1999-41181

(51) Int. Cl.$^7$ ............................................. G06F 17/00
(52) U.S. Cl. ...................... 380/46; 380/210; 380/216; 380/217
(58) Field of Search .................... 708/252; 380/44, 380/46, 200, 210, 216–217

(56) References Cited

U.S. PATENT DOCUMENTS

| | | | | |
|---|---|---|---|---|
| 4,434,322 | A * | 2/1984 | Ferrell ......................... | 380/43 |
| 5,796,776 | A * | 8/1998 | Lomp et al. ................. | 375/222 |
| 6,158,026 | A * | 12/2000 | Kawahara .................... | 380/210 |
| 6,317,422 | B1 * | 11/2001 | Khaleghi et al. ........... | 370/342 |
| 6,389,138 | B1 * | 5/2002 | Li et al. ....................... | 380/35 |
| 6,792,566 | B2 * | 9/2004 | Chen et al. ................... | 380/46 |
| 6,812,864 | B2 * | 11/2004 | Koto et al. ................. | 380/210 |

OTHER PUBLICATIONS

Kuo et al. "A New Signal Encryption Technique and its Attack Study", 1991, IEEE.*
Speech scrambling prior to LPC coding□□Xydeas, C.S.; Hiotakakos, D.J.; Boyd, C.A.;□□Security and Cryptography Applications to Radio Systems, IEE Colloquium on , 1994 □□pp.: 9/1-9/2.*
Key distribution system for digital video signal□□Xiao-Wen Yang; Zhi-Hang Zheng;□□Signal Processing, 1996., 3rd International Conference on , vol.: 2 , Oct. 14-18, 1996 □□pp.: 847-850 vol. 2.*

(Continued)

*Primary Examiner*—David Jung
(74) *Attorney, Agent, or Firm*—Dilworth & Barrese LLP (57) ABSTRACT

An apparatus and method for generating multiple scrambling codes in an asynchronous mobile communication system. In a scrambling code generating apparatus for generating a current scrambling code and a compressed mode scrambling code for compressed mode transmission in a base station device having a spreader for spreading an input data sequence with one of a plurality of OVSF codes and a scrambler for scrambling the spread data sequence with a primary scrambling code used as a default or one of a plurality of secondary scrambling codes according to the number of mobile stations in communication, a first feedback linear shift register generates an m-sequence from first predetermined initial bits, a second feedback linear shift register generates another m-sequence from second predetermined initial bits, a first adder generates the current scrambling code by adding the outputs of the first and second linear feedback shift registers, a second adder adds the output of the second linear feedback register and an m-sequence one bit delayed from the output of the first linear feedback register, and a third adder adds the output of the second linear feedback register and an m-sequence two bits delayed from the output of the first linear feedback register. Here, the compressed mode scrambling code is one of the outputs of the second and third adders and provided to the scrambler to scramble the spread data sequence.

12 Claims, 9 Drawing Sheets

OTHER PUBLICATIONS

Scrambling technique for video object watermarking resisting to MPEG-4 Vassaux, B.; Nguyen, P.; Baudry, S.; Bas, P.; Chassery, J.-M.; Video/Image Processing and Multimedia Communications 4th EURASIP-IEEE Region 8 International Symposium on Video/Image Processing and Multimedia Communications, Jun. 16-19, 2002, Zadar, Croatia.*
Video/Image Processing and Multimedia Communications, 16-19 Jun. 2002, Zadar, Croatia.*

* cited by examiner

FIG. 1

SCRAMBLING CODE LAYOUT

| Index | Code | |
|---|---|---|
| 0 | SCRAMBLING CODE #0 (PRIMARY SCRAMBLING CODE #1) | 201 |
| 1 | SCRAMBLING CODE #1 (SECONDARY SCRAMBLING CODE #1) | 204 |
| ⋮ | | |
| 15 | SCRAMBLING CODE #15 (SECONDARY SCRAMBLING CODE #15) | 205 |
| 16 | SCRAMBLING CODE #16 (PRIMARY SCRAMBLING CODE #2) | 202 |
| 17 | SCRAMBLING CODE #17 (SECONDARY SCRAMBLING CODE #1) | |
| ⋮ | | |
| 31 | SCRAMBLING CODE #31 (SECONDARY SCRAMBLING CODE #15) | |
| 32 | | |
| ⋮ | | |
| 8175 | SCRAMBLING CODE #8175 (SECONDARY SCRAMBLING CODE #15) | |
| 8176 | SCRAMBLING CODE #8176 (PRIMARY SCRAMBLING CODE #1) | 203 |
| ⋮ | | |
| 8191 | SCRAMBLING CODE #8961 (SECONDARY SCRAMBLING CODE #15) | |
| 8192 | EVEN ALTERNATIVE SCRAMBLING CODE FOR SCRAMBLING CODE #0 | 211 |
| 8193 | EVEN ALTERNATIVE SCRAMBLING CODE FOR SCRAMBLING CODE #1 | 212 |
| ⋮ | | 210 |
| 8207 | EVEN ALTERNATIVE SCRAMBLING CODE FOR SCRAMBLING CODE #15 | 213 |
| ⋮ | | 210 |
| 16383 | EVEN ALTERNATIVE SCRAMBLING CODE FOR SCRAMBLING CODE #8191 | |
| 16384 | ODD ALTERNATIVE SCRAMBLING CODE FOR SCRAMBLING CODE #0 | 221 |
| 16385 | ODD ALTERNATIVE SCRAMBLING CODE FOR SCRAMBLING CODE #1 | 222 |
| ⋮ | | 220 |
| 16399 | ODD ALTERNATIVE SCRAMBLING CODE FOR SCRAMBLING CODE #15 | 223 |
| ⋮ | | 220 |
| 24575 | ODD ALTERNATIVE SCRAMBLING CODE FOR SCRAMBLING CODE #8191 | |

Labels: 250; BASE STATION #1 (0–15); BASE STATION #2 (16–31); BASE STATION #512 (8176–8191); BASE STATION #1 (8192–8207); BASE STATION #1 (16384–16399)

FIG. 2

SCRAMBLING CODE LAYOUT

350

| # | Description | Ref |
|---|---|---|
| 0 | SCRAMBLING CODE #0 (PRIMARY SCRAMBLING CODE #1) | 311 |
| 1 | EVEN ALTERNATIVE SCRAMBLING CODE FOR SCRAMBLING CODE #0 | 312 |
| 2 | ODD ALTERNATIVE SCRAMBLING CODE FOR SCRAMBLING CODE #0 | 313 |
| 3 | SCRAMBLING CODE #3 (SECONDARY SCRAMBLING CODE #1) | 314 |
| 4 | EVEN ALTERNATIVE SCRAMBLING CODE FOR SCRAMBLING CODE #3 | 315 |
| 5 | ODD ALTERNATIVE SCRAMBLING CODE FOR SCRAMBLING CODE #3 | 316 |

301 BASE STATION #1

| 45 | SCRAMBLING CODE #45 (SECONDARY SCRAMBLING CODE #15) | 317 |
|---|---|---|
| 46 | EVEN ALTERNATIVE SCRAMBLING CODE FOR SCRAMBLING CODE #45 | 318 |
| 47 | ODD ALTERNATIVE SCRAMBLING CODE FOR SCRAMBLING CODE #45 | 319 |
| 48 | SCRAMBLING CODE #48 (PRIMARY SCRAMBLING CODE #2) | 321 |
| 49 | EVEN ALTERNATIVE SCRAMBLING CODE FOR SCRAMBLING CODE #48 | 322 |
| 50 | ODD ALTERNATIVE SCRAMBLING CODE FOR SCRAMBLING CODE #48 | 323 |
| 51 | SCRAMBLING CODE #51 (SECONDARY SCRAMBLING CODE #1) | 324 |
| 52 | EVEN ALTERNATIVE SCRAMBLING CODE FOR SCRAMBLING CODE #51 | 325 |
| 53 | ODD ALTERNATIVE SCRAMBLING CODE FOR SCRAMBLING CODE #51 | 326 |

302 BASE STATION #2

| 93 | SCRAMBLING CODE #93 (SECONDARY SCRAMBLING CODE #15) | 327 |
|---|---|---|
| 94 | EVEN ALTERNATIVE SCRAMBLING CODE FOR SCRAMBLING CODE #93 | 328 |
| 95 | ODD ALTERNATIVE SCRAMBLING CODE FOR SCRAMBLING CODE #93 | 329 |

| 24528 | SCRAMBLING CODE #24528 (PRIMARY SCRAMBLING CODE #512) | 331 |
|---|---|---|
| 24529 | EVEN ALTERNATIVE SCRAMBLING CODE FOR SCRAMBLING CODE #24528 | 332 |
| 24530 | ODD ALTERNATIVE SCRAMBLING CODE FOR SCRAMBLING CODE #24528 | 333 |
| 24531 | SCRAMBLING CODE #24531 (SECONDARY SCRAMBLING CODE #1) | 334 |
| 24532 | EVEN ALTERNATIVE SCRAMBLING CODE FOR SCRAMBLING CODE #24531 | 335 |
| 24533 | ODD ALTERNATIVE SCRAMBLING CODE FOR SCRAMBLING CODE #24531 | 336 |

303 BASE STATION #512

| 24573 | SCRAMBLING CODE #24573 (SECONDARY SCRAMBLING CODE #15) | 337 |
|---|---|---|
| 24574 | EVEN ALTERNATIVE SCRAMBLING CODE FOR SCRAMBLING CODE #24573 | 338 |
| 24575 | ODD ALTERNATIVE SCRAMBLING CODE FOR SCRAMBLING CODE #24573 | 339 |

APPARATUS AND METHOD FOR GENERATING MULTIPLE SCRAMBLING CODES IN ASYNCHRONOUS MOBILE COMMUNICATION SYSTEM

This application claims priority to an application entitled "Apparatus and Method for Generating Multiple Scrambling Codes in Asynchronous Mobile Communication System" filed in the Korean Industrial Property Office on Sep. 22, 1999 and assigned Serial No. 99-41181, the contents of which are hereby incorporated by reference.

BACKGROUND OF THE INVENTION

1. Field of the Invention

The present invention relates generally to an apparatus and method for generating multiple scrambling codes in a mobile communication system, and in particular, to an apparatus and method for concurrently generating scrambling codes for a normal transmission mode and scrambling codes for a compressed transmission mode, using a pair of initial values without the need for modifying the initial values.

2. Description of the Related Art

The term "a mobile communication system" as used herein is a UMTS (Universal Mobile Telecommunication System) that operates according to the 3GPP (3rd Generation Partnership Provider) standards.

The UMTS normally implements inter-frequency handoff. The inter-frequency handoff occurs between base stations with different frequency assignments. To create an inter-frequency handoff, a mobile station discontinues communication with a serving base station for a predetermined time, in contrast to a handoff with an identical frequency assignment. The non-data transmission period is referred to as an idle period. During the idle period, the mobile station searches for the frequency of a destination base station, which is different from that of the serving base station. After detecting the frequency, the mobile station searches for a control channel at that frequency. If the mobile station succeeds in detecting the frequency and control channel of the destination base station, it resumes communication with the serving base station in the serviced frequency band and commences communication with the destination base station in the new frequency band based on the detected frequency and control channel information, thereby completing the handoff.

According to the 3GPP standards, the idle period is produced within a 10-ms frame. Data transmission is discontinued during the idle period and resumes during the next 10-ms frame. This is called compressed mode transmission.

Generally, an idle period can be generated within one frame by transmitting less data in a compressed transmission mode than in a normal mode. There are two ways of creating an idle period in one frame: transmitting data of a 10-ms frame at a decreased code rate through puncturing; and reducing the SF (Spreading Factor) of the spreading code used by half to transmit one frame data for a half frame period and designating the other half frame period as an idle period.

A 3GPP frame is 10 ms in duration. If the frame data is spread by a spreading code an SF of one half, the data is transmitted for 5ms. As a result, a 5-ms idle period is produced. The mobile station discontinues communication with the old base station and searches for a frequency other than the serving frequency during the idle period. The idle period may be dropped further to below 50% of one frame length through rate matching, when necessary.

A drawback of the above idle period generating method is that channel contention might occur since orthogonality is not guaranteed between a downlink channel transmitted at a compressed transmission mode and other downlink channels. This problem is attributed to the characteristic of OVSF (Orthogonal Variable Spreading Factor) codes for channelization in the 3GPP standards.

Figure 1:
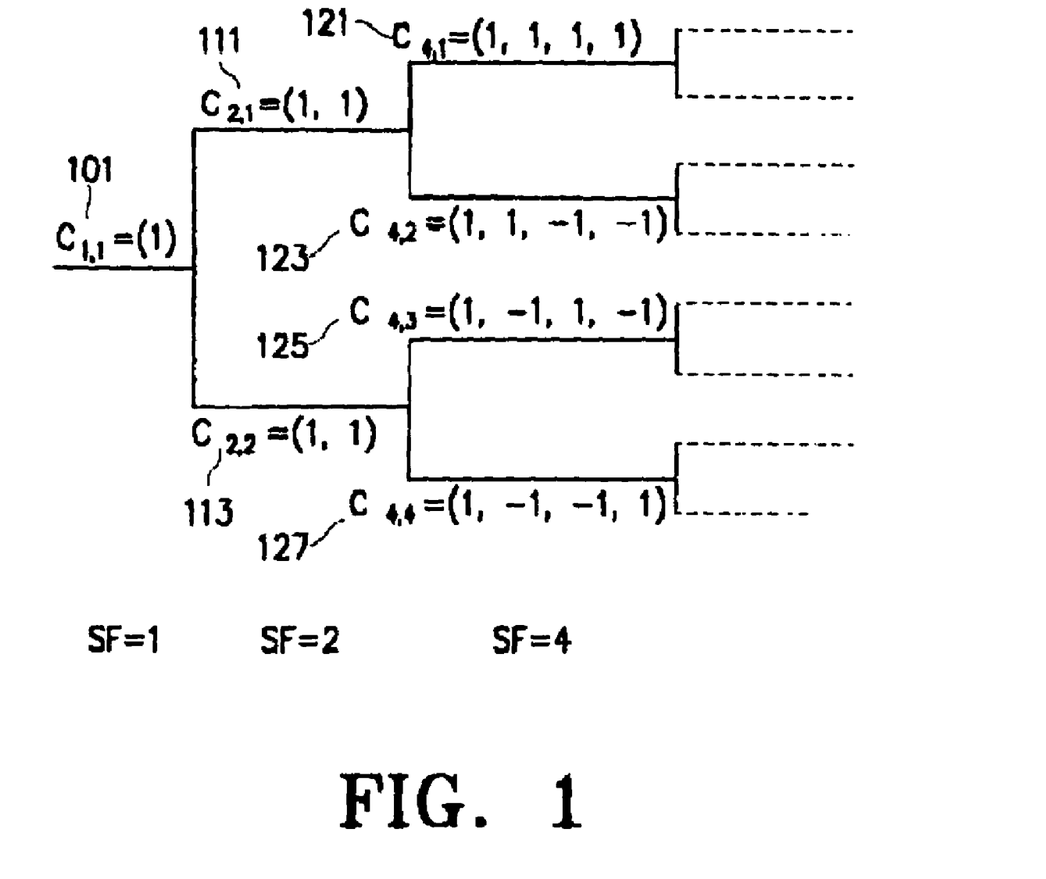
FIG. 1 illustrates a code tree from which OVSF codes are generated in a conventional mobile communication system.

OVSF codes provide channelization to downlink channels and ensures orthogonality among downlink channels with different data rates and SFs. FIG. 1 illustrates an OVSF code generation method. As shown in FIG. 1, OVSF codes are a kind of Walsh code which are generated by increasing the SF. Codes with an identical SF are mutually orthogonal as observed in codes 111 and 113 and codes 121, 123, 125, and 127. Codes with different SFs can also be mutually orthogonal as observed between codes 111 and 125, codes 111 and 127, codes 113 and 121, and codes 113 and 123. Thus OVSF codes may be orthogonal regardless of an identical SF or different SFs. In contrast, orthogonality is not guaranteed between codes 111 and 121, codes 111 and 123, codes 113 and 125, and codes 113 and 127. That is, OVSF codes with a higher SF are not orthogonal to their source OVSF.

In view of the above-described characteristic of the OVSF codes, orthogonality is not guaranteed between a downlink channel transmitted in the compressed mode and some other downlink channels when an idle period is created within one frame by decreasing a specific SF to a half at the compressed transmission mode. As a result, contention may occur among the downlink channels. Referring to FIG. 1, in the case where mobile stations A and B are assigned to codes 121 and 123, respectively, the base station transmits downlink channels using the same code 111 in the compressed mode, causing contention between the downlink channels. Therefore, the above idle period producing method is viable only if there is no contention between a new OVSF code with a half of the SF used for the normal transmission mode and existing OVSF codes.

An OVSF code with a half of the SF of an existing OVSF code can be used without channel contention through scrambling with a different scrambling code in the base station. Scrambling codes available to base stations are numbered with 0 to 262,143 in the 3GPP standards. To identify base stations, $16 \times k$ (k=0, ..., 511)$^{th}$ codes are designated as primary scrambling codes and (16×k)+j codes (k=0, ..., 511 and j=1, ..., 15) as secondary scrambling codes. 15 secondary scrambling codes are designated per primary scrambling code. A total of 8192 scrambling codes are available for normal mode transmission. Besides, there are 8192 even-numbered alternative scrambling codes and 8192 odd-numbered alternative scrambling codes for compressed mode transmission. Scrambling codes labeled with numbers 8192 higher than those of the normal mode scrambling codes are assigned as the even-numbered alternative scrambling codes, and scrambling codes labeled with numbers 16384 higher than those of the normal mode scrambling codes are assigned as the odd-numbered alternative scrambling codes.

Prior to transmission over a channel, a base station which operates based on 3GPP spreads the channel with an OVSF code for primary identification and scrambles the channel with a scrambling code for secondary identification. In the course of the scrambling, the base station uses a primary scrambling code or a secondary scrambling code. The secondary scrambling code is used in the case where the base station has no downlink channel to assign to a mobile station due to the lack of OVSF codes used together with primary scrambling codes. No contention occurs between channels spread with an identical OVSF code but scrambled with primary and secondary scrambling codes, respectively.

By introducing the notion of increasing base station capacity using the secondary scrambling codes to the conventional method of creating an idle period by decreasing SF by half, a channel can be generated that is immune to contention and incurs no interference with existing channels and an intended idle period can be obtained.

To use a scrambling code other than that for normal mode transmission in a compressed transmission mode, the mobile station must choose a scrambling code designated for compressed mode transmission that is the pair to the normal mode scrambling code.

In conventional technology, a pair of scrambling codes for compressed mode transmission are assigned to one scrambling code for normal mode transmission. Each base station has 16 scrambling codes for the normal mode and 32 codes for the compressed mode. The 32 scrambling codes are divided into 16 even-numbered alternative scrambling codes and 16 odd-numbered alternative scrambling codes. To commence compressed mode transmission during communication with a mobile station in a normal mode, the base station chooses one of even-numbered and odd-numbered alternative scrambling codes according to a predetermined rule.

The choice between an even alternative scrambling code and an odd alternative scrambling code depends on whether the OVSF code used in the normal mode is even-numbered or odd-numbered. If the OVSF code is even-numbered, the base station selects an even-numbered alternative scrambling code that is the counterpart of a primary or secondary scrambling code used in the normal mode, and vice versa. In FIG. 1, codes 123 and 127 are even-numbered OVSF codes and codes 121 and 125 are odd-numbered OVSF codes.

In case a channel is to be scrambled with a changed scrambling code for compressed mode transmission, the base station checks whether there is an available upper OVSF code having an SF half less than that of the current OVSF code in use for normal mode transmission in an OVSF code generation tree. In the presence of an available upper OVSF code, the base station assigns the upper OVSF code for the compressed mode transmission.

On the other hand, if there are no such available upper OVSF codes, the base station determines whether the current OVSF code is even-numbered or odd-numbered. Then, the base station informs the mobile station of a scrambling code corresponding to the OVSF code. The base station reduces the SF of the current OVSF code used in the normal mode for channelization and transmits a frame scrambled with the scrambling code known to the mobile station in the compressed mode.

Figure 2:
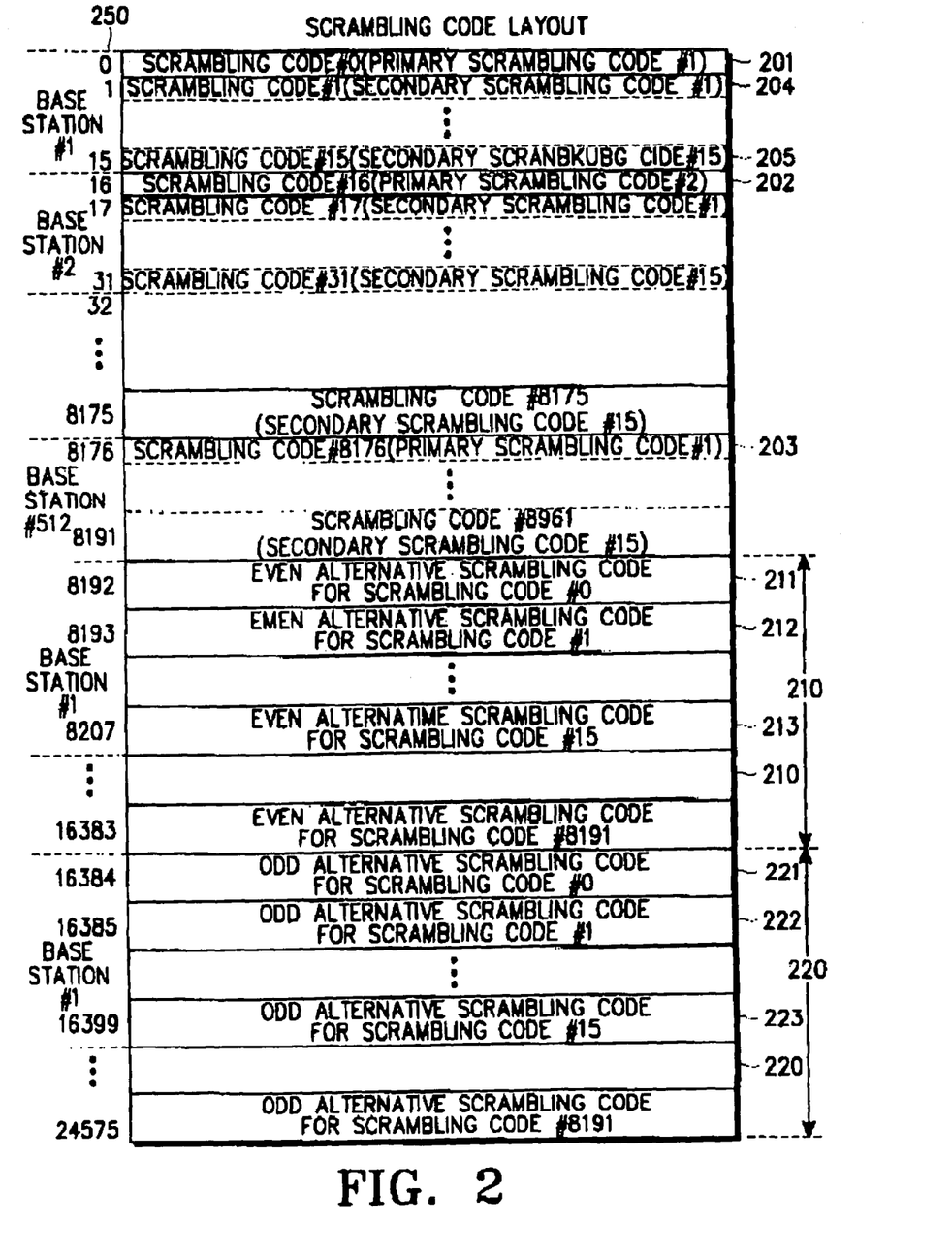
FIG. 2 is a layout diagram of scrambling codes in the conventional mobile communication system.

The base station assigns scrambling codes in the way shown in FIG. 2 to transition from a normal mode to a compressed mode. In FIG. 2, reference numeral 250 denotes the indexes of scrambling codes. 16 consecutive scrambling codes are assigned to each base station and the index of the base station is identical to that of its primary scrambling code.

Reference numeral 201 denotes scrambling code #0 (i.e., a primary scrambling code #1) assigned to base station #1.

As shown in FIG. 2, each base station has 1 primary scrambling code and 15 secondary scrambling codes to increase base station capacity. For example, base station #1 has 15 secondary scrambling codes, scrambling code #1 to #15 as indicated by reference numbers 204 to 205.

A scrambling code 202 is assigned as a primary scrambling code to base station #2. As stated above, each base station is assigned to 16 consecutive scrambling codes. 16×i (i=0, . . . , 511)-numbered scrambling codes are primary scrambling codes, and (16×i)+k (i=0, . . . , 511 and k=0, . . . , 15)-numbered scrambling codes are secondary scrambling codes. A primary scrambling code 203 (i.e., scrambling code #8175 and primary scrambling code #512) is assigned to base station #512.

The set of scrambling codes available for compressed mode transmission includes 8192 scrambling codes #8192 to #16383 and 8192 more scrambling codes #16384 to #24576. The scrambling code set is divided into two parts 210(#8192 to #16383) and 220(#16384 to #24576). Reference numeral 210 denotes even alternative scrambling codes (scrambling codes #8192 to #16383) and reference numeral 220 denotes odd alternative scrambling codes (scrambling codes #16384 to #24575). An even alternative scrambling code is chosen for compressed mode transmission if an OVSF code used for a downlink channel in a normal mode is even-numbered, and an odd alternative scrambling code is chosen for compressed mode transmission if the OVSF code is odd-numbered.

An even alternative scrambling code 211 is numbered with 8192, matched to the scrambling code 201. An even alternative scrambling code 212 is numbered with 8193, matched to the scrambling code 204. An even alternative scrambling code 213 is numbered with 8207, matched to the scrambling code 205. 16 even alternative scrambling codes 211 to 213 are assigned to base station #1.

The even alternative scrambling codes in the set 210 are numbered with 8192+j (the number of a scrambling code for normal mode transmission j=0, . . . , 8191). For example, for j=1, its corresponding even alternative scrambling code is 8193(=1(j))+8192). This implies that a $j^{th}$ scrambling code (#0 to #8191) is one-to-one matched with a j+8192)th even alternative scrambling code.

An odd alternative scrambling code 221 is numbered with 16384, matched to the scrambling code 201. An odd alternative scrambling code 222 is numbered with 16385, matched to the scrambling code 204. An odd alternative scrambling code 223 is numbered with 16399, matched to the scrambling code 205. 16 odd alternative scrambling codes 211 to 213 are assigned to base station #1. The odd alternative scrambling code in the set 220 are numbered with 16384+j (the number of a scrambling code for normal mode transmission j=0, . . . , 8191) and a $j^{th}$ scrambling code(#0 to #8191) is one-to-one matched with a $(j+8192)^{th}$ odd alternative scrambling code.

As described above, 8192 scrambling codes #0 to #8191 are assigned for normal mode transmission. For compressed mode transmission, 8192 consecutive scrambling codes #8192 to 16383 are assigned as even alternative scrambling codes and 8192 more consecutive scrambling codes #16384 to 24575 are assigned as odd alternative scrambling codes.

The above conventional scrambling code assignment method has the instinctive drawback of increased hardware complexity in a scrambling code generator. The scrambling code generator modifies initial values to generate compressed mode scrambling codes upon every entry into a compressed transmission mode. Alternatively, scrambling codes must be separately procured to generate a normal mode scrambling code, a compressed mode even alternative scrambling code, and a compressed mode odd alternative scrambling code, respectively.

For example, if a base station refers to the convention scrambling code numbering method shown in FIG. 2, the base station must be provided with compressed mode scrambling code generators as well as a normal mode scrambling code generators to allow a mobile station within the coverage area of the base station to transmit in a compressed transmission mode. The compressed mode scrambling code generators include an even alternative scrambling code generator and an odd alternative scrambling code generator. That is, the base station should have at least three scrambling code generators to support the normal transmission mode and the compressed transmission mode.

SUMMARY OF THE INVENTION

It is, therefore, an object of the present invention to provide a scrambling code assigning apparatus in which a scrambling code for normal mode transmission and scrambling codes for compressed mode transmission are simultaneously generated without changing initial values, for use in scrambling code generators of a base station and a mobile station.

It is another object of the present invention to provide a method for simultaneously generating a scrambling code for normal mode transmission and scrambling codes for compressed mode transmission without changing initial values in a mobile communication system.

The above objects can be achieved by providing an apparatus and method for generating multiple scrambling codes in an asynchronous mobile communication system. According to one aspect of the present invention, in a scrambling code generating apparatus for generating a current scrambling code and a compressed mode scrambling code for compressed mode transmission in a base station device having a spreader for spreading an input data sequence with one of a plurality of OVSF codes and a scrambler for scrambling the spread data sequence with a primary scrambling code used as a default or one of a plurality of secondary scrambling codes according to the number of mobile stations in communication, a first feedback linear shift register generates an m-sequence from first predetermined initial bits, a second feedback linear shift register generates another m-sequence from second predetermined initial bits, a first adder generates the current scrambling code by adding the outputs of the first and second linear feedback shift registers, a second adder adds the output of the second linear feedback register and an m-sequence one bit delayed from the output of the first linear feedback register, and a third adder adds the output of the second linear feedback register and an m-sequence two bits delayed from the output of the first linear feedback register. Here, the compressed mode scrambling code is one of the outputs of the second and third adders and provided to the scrambler to scramble the spread data sequence.

According to another aspect of the present invention, in a scrambling code generating apparatus for generating a current scrambling code and a compressed mode scrambling code for compressed mode transmission in a mobile station device having a descrambler for descrambling an input data sequence with a primary scrambling code used as a default or one of a plurality of secondary scrambling codes according to the number of mobile stations in communication, and a despreader for despreading the descrambled data sequence with one of a plurality of OVSF codes, a first feedback linear shift register generates an m-sequence from first predetermined initial bits, a second feedback linear shift register generates another m-sequence from second predetermined initial bits, a first adder generates the current scrambling code by adding the outputs of the first and second linear feedback shift registers, a second adder adds the output of the second linear feedback register and an m-sequence one bit delayed from the output of the first linear feedback register, and a third adder adds the output of the second linear feedback register and an m-sequence two bits delayed from the output of the first linear feedback register. Here, the compressed mode scrambling code is one of the outputs of the second and third adders and provided to the descrambler to descramble the input data sequence.

BRIEF DESCRIPTION OF THE DRAWINGS

The above and other objects, features and advantages of the present invention will become more apparent from the following detailed description when taken in conjunction with the accompanying drawings in which:

FIG. 3 is a layout diagram of scrambling codes in a mobile communication system according to an embodiment of the present invention;

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

The present invention is intended to provide an apparatus and method for numbering a primary or secondary scrambling code for normal mode transmission and even and odd alternative scrambling codes matched with the normal mode scrambling code for compressed mode transmission with consecutive indexes and generating the scrambling codes simultaneously without modifying initial values used in a scrambling code generator.

FIG. 3 is a layout diagram of scrambling codes available to base stations according to an embodiment of the present invention. In FIG. 3, reference numeral 350 denotes the indexes of the scrambling codes. In the present invention, 48 consecutive scrambling codes are assigned to each base station. Reference numeral 311 denotes scrambling code #0, i.e., primary scrambling code #1 assigned to base station #1. Reference numeral 312 denotes scrambling code #1, i.e., an even alternative scrambling code matched with scrambling code #0, for use in compressed mode transmission. Reference numeral 313 denotes scrambling code #2, i.e., an odd alternative scrambling code matched with scrambling code #0 for use in compressed mode transmission. Reference numeral 314 denotes scrambling code #3, i.e., secondary scrambling code #1 assigned to base station #1. Reference numeral 315 denotes scrambling code #4, i.e., an even alternative scrambling code matched with scrambling code #3, for use in compressed mode transmission. Reference numeral 316 denotes scrambling code #5, i.e., an odd alternative scrambling code matched with scrambling code #3 for use in compressed mode transmission. Reference numeral 317 denotes scrambling code #45, i.e., secondary scrambling code #15 assigned to base station #1. Reference numeral 318 denotes scrambling code #46, i.e., an even alternative scrambling code matched with scrambling code #45, for use in compressed mode transmission. Reference numeral 319 denotes scrambling code #47, i.e., an odd alternative scrambling code matched with scrambling code #45 for compressed mode transmission.

As stated above, each base station uses 48 consecutive scrambling codes according to the present invention. The scrambling codes are arranged in the following order: normal mode scrambling code, even alternative scrambling code, and odd alternative scrambling code. Such a scrambling code layout obviates the need for modifying initial values in generating scrambling codes. An even alternative scrambling code and an odd alternative scrambling code are generated by shifting a scrambling code for normal mode transmission, once and twice, respectively. Therefore, an encoder for generating the normal mode scrambling code outputs a code one tap earlier to produce the even alternative scrambling code and two taps earlier to produce the odd alternative scrambling code.

In FIG. 3, reference numerals 321 to 329 denote scrambling codes available to base station #2. Reference numeral 321 denotes scrambling code #48, i.e., a primary scrambling code for base station #2. Reference numeral 322 denotes scrambling code #49, i.e., an even alternative scrambling code matched with scrambling code #48. Reference numeral 323 denotes scrambling code #50, i.e., an odd alternative scrambling code matched with scrambling code #48. Reference numeral 324 denotes scrambling code #51, i.e., secondary scrambling code #1 for base station #2. Reference numeral 325 denotes scrambling code #52, i.e., an even alternative scrambling code matched with scrambling code #51. Reference numeral 326 denotes scrambling code #53, i.e., an odd alternative scrambling code matched with scrambling code #51. Reference numeral 327 denotes scrambling code #93, i.e., secondary scrambling code #15 for base station #2. Reference numeral 328 denotes scrambling code #94, i.e., an even alternative scrambling code matched with scrambling code #93. Reference numeral 329 denotes scrambling code #95, i.e., an odd alternative scrambling code matched with scrambling code #93.

Similarly, reference numerals 331 to 339 denote scrambling codes available to base station #512. Reference numeral 331 denotes scrambling code #24528, i.e., a primary scrambling code for base station #512. Reference numeral 332 denotes scrambling code #24529, i.e., an even alternative scrambling code matched with scrambling code #24528. Reference numeral 333 denotes scrambling code #24530, i.e., an odd alternative scrambling code matched with scrambling code #24528. Reference numeral 334 denotes scrambling code #24531, i.e., secondary scrambling code #1 for base station #512. Reference numeral 335 denotes scrambling code #24532, i.e., an even alternative scrambling code matched with scrambling code #24531. Reference numeral 336 denotes scrambling code #24533, i.e., an odd alternative scrambling code matched with scrambling code #24531. Reference numeral 337 denotes scrambling code #24573, i.e., secondary scrambling code #15 for base station #512. Reference numeral 338 denotes scrambling code #24574, i.e., an even alternative scrambling code matched with scrambling code #24573. Reference numeral 339 denotes scrambling code #24575, i.e., an odd alternative scrambling code matched with scrambling code #24573.

Figure 4:
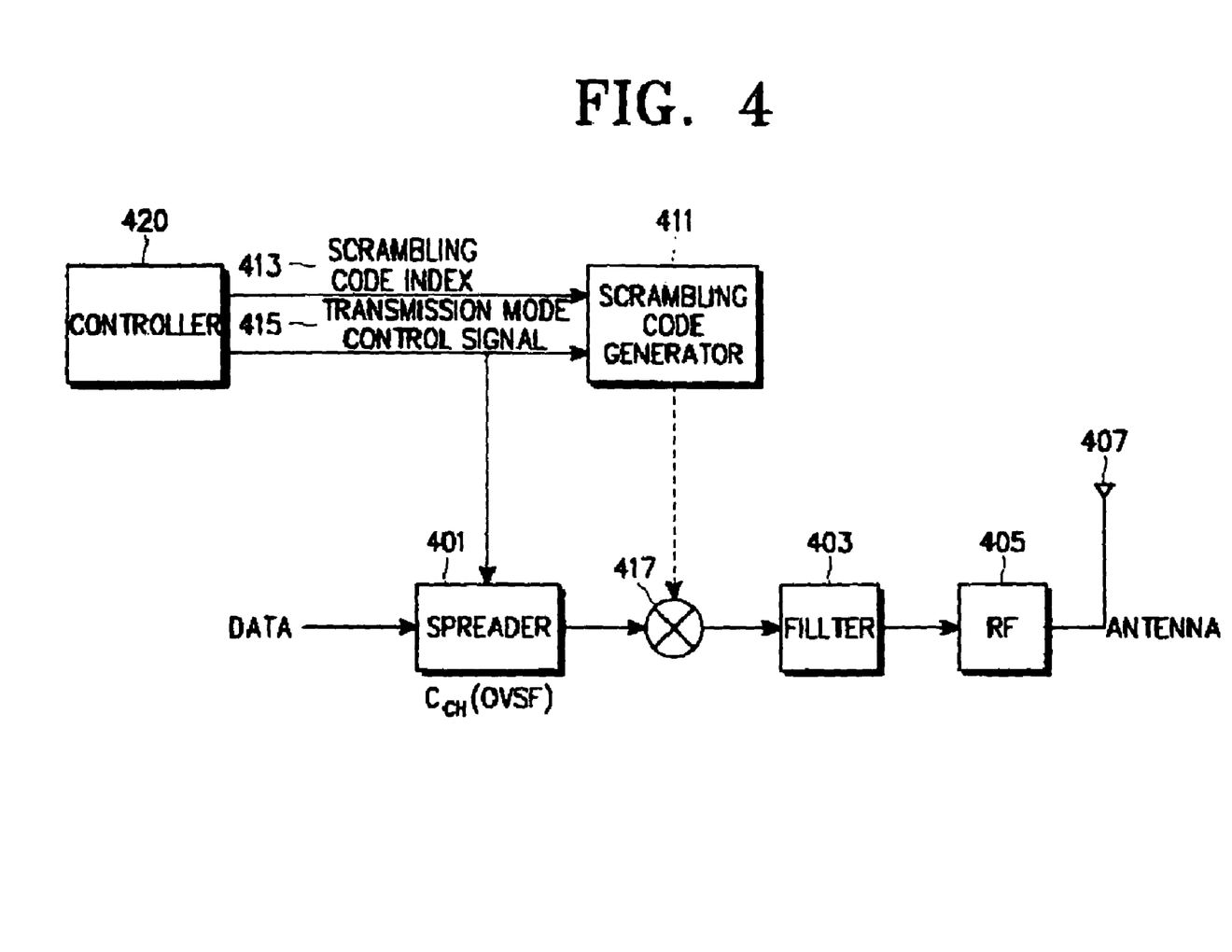
FIG. 4 is a block diagram illustrating a transmitting device using a scrambling code generator in the mobile communication system according to the embodiment of the present invention.

FIG. 4 is a block diagram of a transmitting device using a scrambling code generator in a base station according to an embodiment of the present invention. The transmitting device is illustratively configured with a downlink channel toward one mobile station only. Referring to FIG. 4, a controller 420 provides overall control to the transmitting device according to the present invention. The controller 420 receives information about the mobile station from a base station controller (BSC) or a mobile switching center (MSC) (both not shown) and outputs transmission mode control information including a transmission mode control signal 415 and a scrambling code index 413 based on a transmission mode of the mobile station. A spreader 401 determines the SF of an OVSF(Orthogonal Variable Spreading Factor) code via the transmission mode control signal 415 received from the controller 420 and spreads data with an OVSF code with the determined SF(Spreading Factor). If the transmission mode control signal 415 is a compressed transmission mode signal, the spreader 401 spreads the data with an OVSF code with an SF decreased by a factor of one half, as compared to the current OVSF code.

While the spreader 401 generally produces OVSF codes appropriate for downlink channel and spreads the downlink channel with the OVSF code, the following description is confined to the spreading operation of the spreader 401 for better understanding of the present invention.

The OVSF code with the half SF is equivalent to the root of the current OVSF code used at the normal transmission mode on an OVSF code generation tree. A multiplier 417 multiplies the spread data by a scrambling code available to the base station. The multiplier 417 and a scrambling code generator 411 act as a scrambler for scrambling the transmit data with the scrambling code.

Control information of the controller 420 includes the type(primary/secondary/even/odd), number(scrambling code number), and transmission mode(normal mode/compressed mode) of scrambling code assigned to downlink channels in the base station. For the base station #1, the type and number of scrambling code according to transmission mode of downlink channel are listed in Table 1.

TABLE 1

|  | Primary scrambling code | secondary scrambling code | even alternative scrambling code | odd alternative scrambling code |
| --- | --- | --- | --- | --- |
| normal | 1 | 0 | 0 | 0 |
| transmission mode | 1 | a | 0 | 0 |

TABLE 1-continued

| | Primary scrambling code | secondary scrambling code | even alternative scrambling code | odd alternative scrambling code |
|---|---|---|---|---|
| normal transmission mode + | 1 | 0 | 1 | 1 |
| compressed transmission mode | 1 | a | 1~(a + 1) | 1~(a + 1) |

As noted from Table 1, the number and type of scrambling code used in a base station vary according to transmission mode. The 'a' indicates the number of secondary scrambling code required to increase base station capacity, ranging from 1 to 15.

The controller 420 shown in FIG. 4 detects the number and type of scrambling code used for current downlink channel and transmits the transmission mode control signal 415 and the scrambling code index signal 413 to the scrambling code generator 411 to generate the necessary scrambling code. The controller 420 controls the spreader 401 to generate OVSF code appropriate for downlink channel in a normal transmission mode or in a compressed mode transmission.

Upon receipt of the scrambling code index 413 and the transmission mode control signal 415, the scrambling code generator 411 generates a scrambling code for normal mode transmission using the scrambling code index 413 as initial values. The output of the scrambling code generator 411 may be one primary scrambling code, one to fifteen secondary scrambling codes, one to fifteen even alternative scrambling codes or one to fifteen odd alternative scrambling codes. According to the transmission mode control signal 415, the scrambling code generator 411 generates scrambling codes for both normal mode transmission and compressed mode transmission. The scrambling codes for compressed mode transmission include an even alternative scrambling code and an odd scrambling code. The even or odd alternative scrambling code is selected respectively according to whether the OVSF code in current used for a downlink channel is even-numbered or odd-numbered. The scrambling code generator 411 generates the even alternative scrambling code by shifting the normal mode scrambling code once and the odd alternative scrambling code by shifting the normal mode scrambling code twice. The multiplier 417 scrambles the downlink channel data with a scrambling code received from the scrambling code generator 411. The scrambled downlink channel is transmitted to the mobile station through a filter 403, an RF (Radio Frequency) module 405, and an antenna 407.

Figure 5:
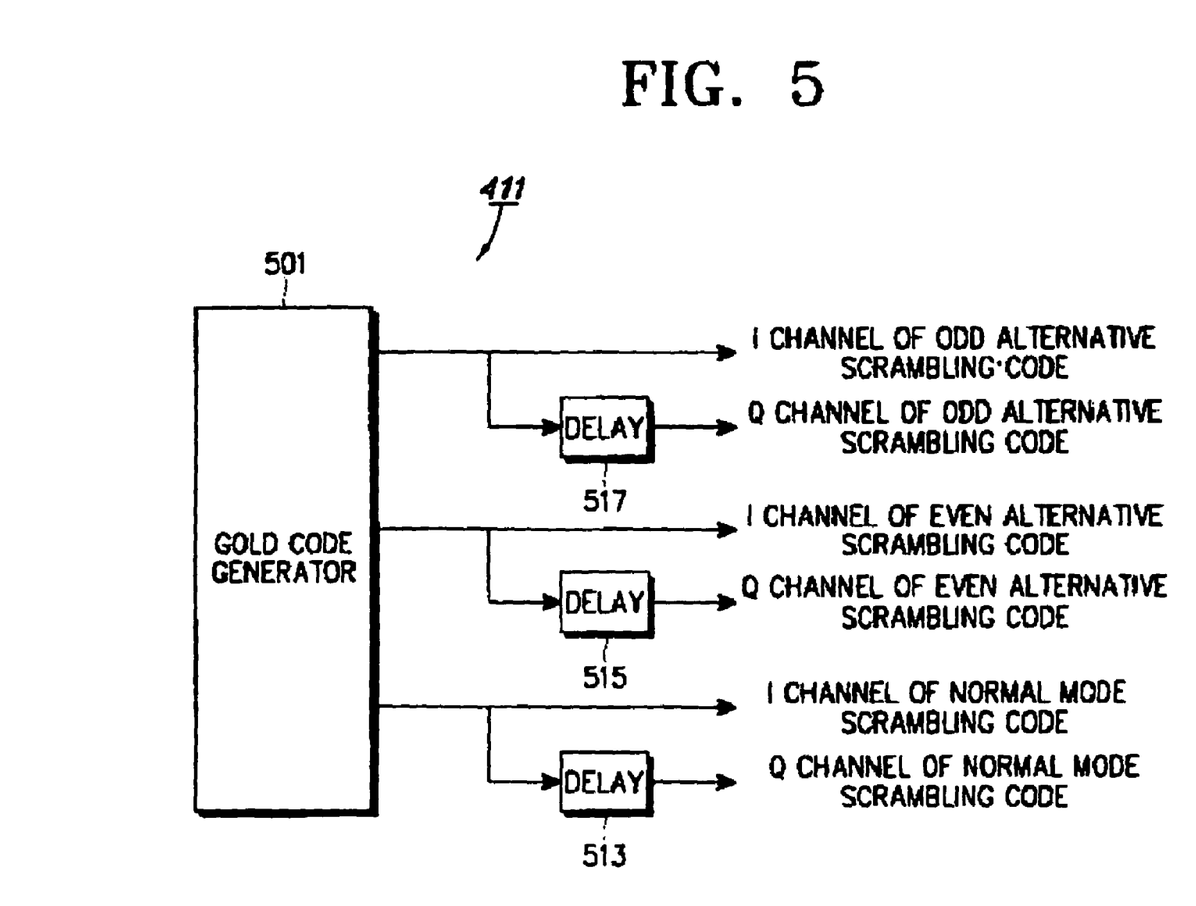
FIG. 5 is a block diagram illustrating the scrambling code generator according to the embodiment of the present invention.

FIG. 5 is a block diagram of the scrambling code generator according to the embodiment of the present invention. It is assumed here that the base station uses a primary scrambling code only.

In FIG. 5, the scrambling code generator is comprised of a Gold code generator 501 having two shift registers that generate m-sequences and a scrambling code generation portion for generating complex scrambling codes with I channel codes and Q channel codes out of a generated Gold code. The Gold code generator 501 generates four kinds of Gold codes for use in generating a primary scrambling code, a secondary scrambling code, an even alternative scrambling code, and an odd alternative scrambling code. Thus, the scrambling code generator 411 has a scrambling code generation portion for each downlink channel.

The scrambling code generation portion includes delays 513 to 517 for delaying the Gold code received from the Gold code generator 501 by predetermined chips. The number of delays is equal to the number N of scrambling codes that can be generated in the base station.

Figure 6:
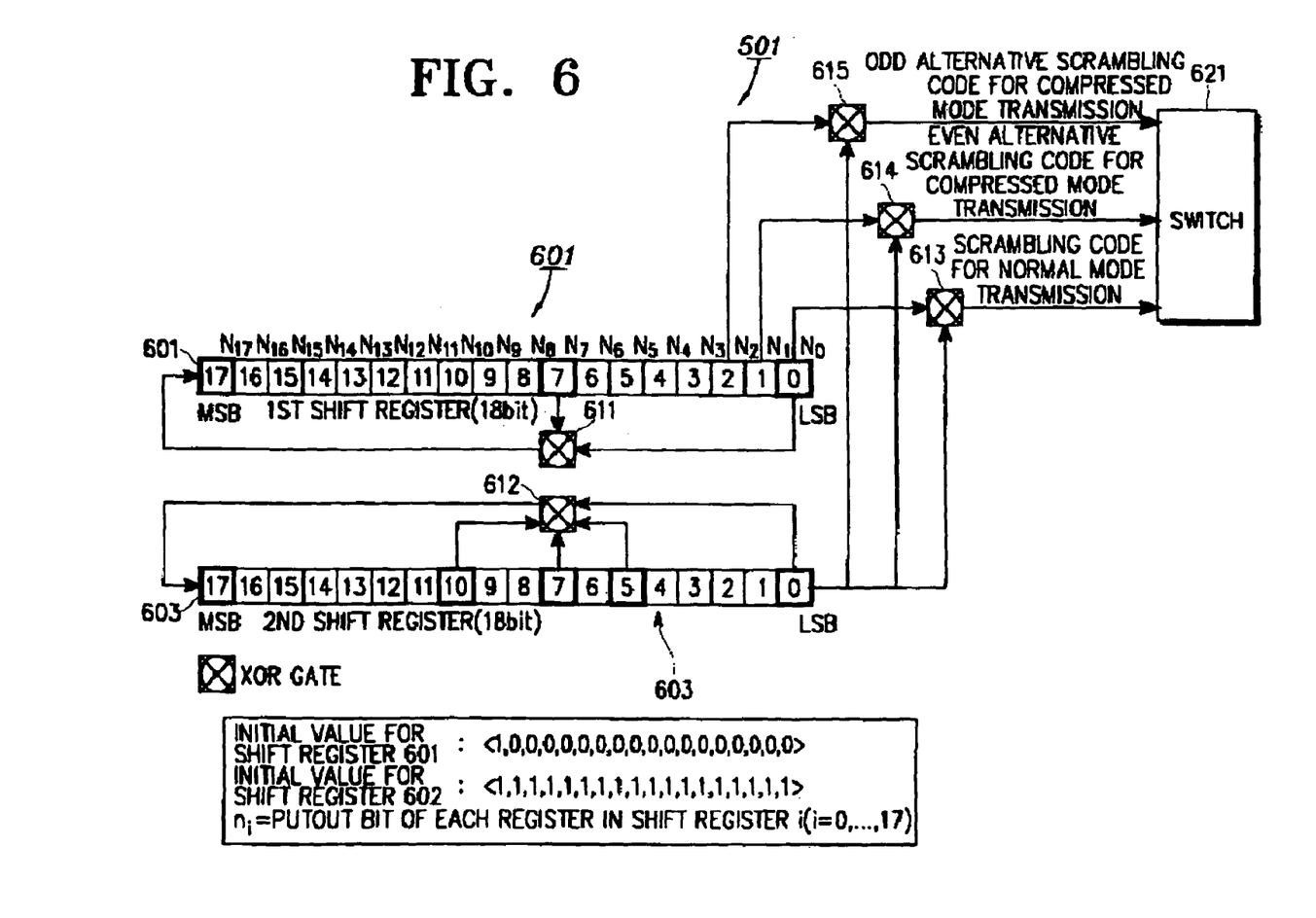
FIG. 6 illustrates the structure of a Gold code generator.

FIG. 6 is a block diagram of the Gold code generator that generates different Gold codes according to the embodiment of the present invention. The in Gold code generator is assumed to generate Gold codes to be used for one mobile station only, with reference to the scrambling code layout shown in FIG. 3.

In FIG. 6, shift registers 601 and 603 generate different m-sequences. A Gold code is produced by XOR-ing(adding) the m-sequences. An XOR gate 611 XOR-gates bits stored in register #0 and register #7 and feeds the result to register #17 of the shift register 601. An XOR gate 612 XOR-gates bits stored in registers #0, #5, #7, and #10 and feeds the result in register #17 of the shift register 603.

XOR gates 613, 614, and 615 generate Gold codes to be used in generating a normal mode scrambling code (primary scrambling code or secondary scrambling code), an even alternative scrambling code, and an odd alternative scrambling code. The even and odd alternative scrambling codes being paired with the primary scrambling code. A switch 621 selects one of the scrambling codes received from the XOR gates 613, 614, and 615 according to the scrambling code index 413 and the transmission mode control signal 415 received from the controller 420. If the transmission mode control signal 415 indicates a compressed transmission mode and an even-numbered OVSF code is used, an even alternative scrambling code is selected.

For example, if a primary scrambling code is used for normal mode transmission and an even-numbered OVSF code is assigned to a specific mobile station, the XOR gate 613 generates a Gold code to produce the primary scrambling code (scrambling code #0). At that case, if the transmission mode is changed to compressed mode, the XOR gate 614 generates a Gold code to produce an even alternative scrambling code matched with the primary scrambling code. If an odd-numbered OVSF code is assigned, the XOR gate 615 generates a Gold code to produce an odd alternative scrambling code matched with the primary scrambling code according to the scrambling code layout shown in FIG. 3. The switch 621 selects one of the Gold codes received from the XOR gates 613, 614, and 615 according to the transmission mode of a downlink channel to the mobile station and the number of the OVSF code assigned to the mobile station.

FIG. 6 shows the Gold code generator on the assumption that only one primary scrambling code is used for a downlink channel to one mobile station, the downlink channel is transmitted in an alternating normal/compressed mode, and the scrambling code layout shown in FIG. 3 is referred to.

The Gold code generator shown in FIG. 6 operates based on the Fibonacci method of generating m-sequences. The shift register 601 is 18 in length and implements an m-sequence $m_1(t)$ generator polynomial, $f(x)=x^{18}+x^7+1$. This polynomial has the feedback characteristic shown below with respect to consecutive symbols in a generated code.

$$X(18+i)=\{x(i)+x(i+7)\} \text{ modulo } 2 \ (0 \leq i \leq 2^{18}-20) \quad (1)$$

An initial value can arbitrarily be selected for the shift register 601. Scrambling codes based on 3GPP are generated by shifting a scrambling code that is produced from the initial values. That is, if a base station that operates according to the 3GPP standards uses scrambling code #125, scrambling code #125 is generated by shifting a scrambling code generated using the initial value 125 times. Therefore, an initial value of the shift register 601 for use in completing scrambling code #125 results from 125 times shifting an initial value used to generate scrambling code #0. A binary number resulting from subtracting 1 from the scrambling code used in the base station is used as an initial value. In the embodiment of the present invention, <1, 0, 0, 0, 0, 0, 0, 0, 0, 0, 0, 0, 0, 0, 0, 0, 0, 0> is the initial value for the shift register 601. It is assumed that the scrambling code 311 in FIG. 3 is generated from the initial value.

The shift register 603 is the same length as the shift register 601 and implements an m-sequence $m_2(t)$ generator polynomial, $f(x)=x^{18}+x^{10}+x^7+x^5+1$. This polynomial has the feedback characteristic shown below with respect to consecutive symbols in a generated code.

$$X(18+i)=\{x(i)+x(i+5)+x(i+7)+x(i+10)\} \text{ modulo } 2 \ (0 \leq i \leq 2^{18}-20) \quad (2)$$

An initial value of the m-sequence $m_2(t)$ is common in all base stations. In the embodiment of the present invention, <1, 1, 1, 1, 1, 1, 1, 1, 1, 1, 1, 1, 1, 1, 1, 1, 1, 1> is the initial value for the shift register 603.

The XOR gate 611 XOR-s the bit of register #0 and the bit of register #7 and inputs the result in register #17. This feedback satisfies Eq. 1. The XOR gate 612 XOR-s the bits of registers #0, #5, #7, and #10 and inputs the result in register #17. This feedback satisfies Eq. 2.

The XOR gate 613 generates a Gold sequence by XOR-ing the output of register #0 in the shift register 601 with the output of register #0 in the shift register 603. The XOR gate 614 generates a Gold sequence by XOR-ing the output of register #1 in the shift register 601 with the output of register #0 in the shift register 603. The XOR gate 615 generates a Gold sequence by XOR-ing the output of register #2 in the shift register 601 with the output of register #0 in the shift register 603. The Gold sequence generated from the XOR gate 614 is equivalent to a once-shifted sequence of the Gold sequence generated from the XOR gate 613. The Gold sequence generated from the XOR gate 615 is equivalent to a twice-shifted sequence of the Gold sequence generated from the XOR gate 613.

The switch 621 selects one of the Gold sequences received from the XOR gates 613, 614, and 615 according to the transmission mode of a downlink channel and the OVSF code number used at the channel.

Figure 7:
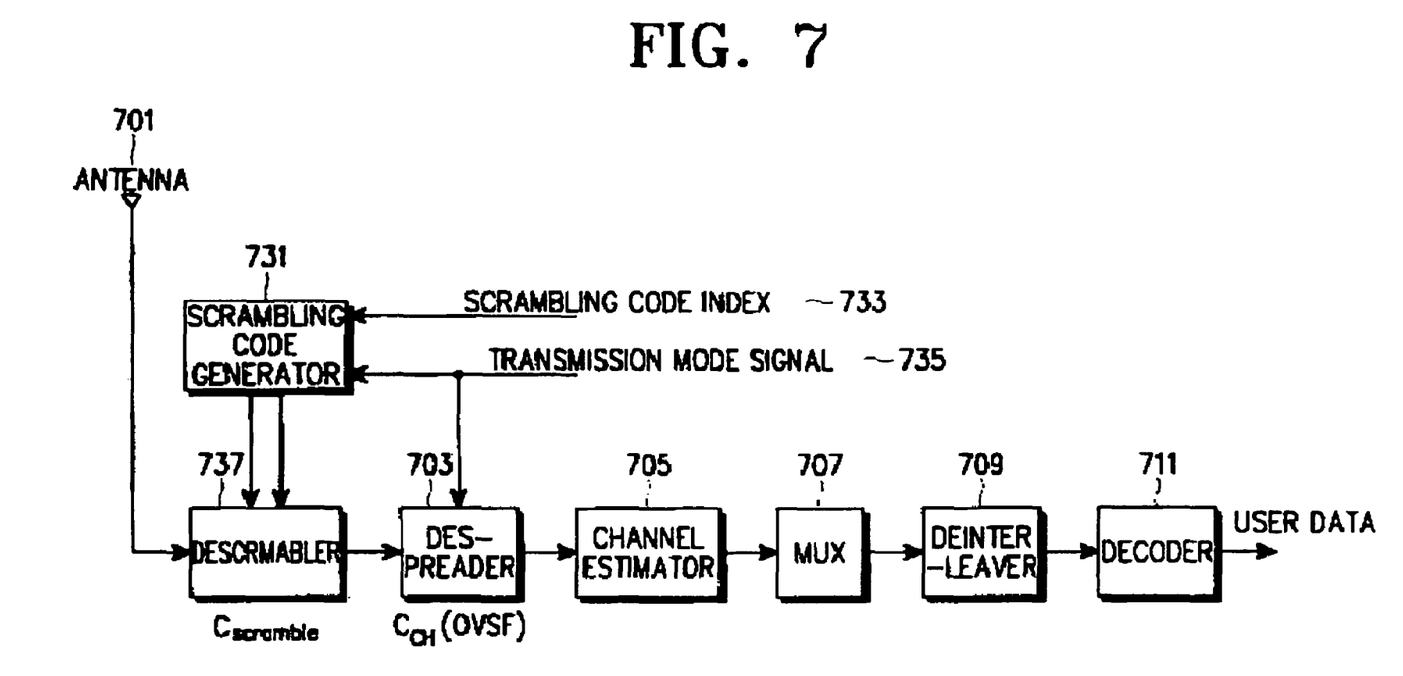
FIG. 7 is a block diagram illustrating a receiving device using the scrambling code generator in the mobile communication system according to the embodiment of the present invention.

FIG. 7 is a block diagram illustrating a receiving device in a mobile station according to the embodiment of the present invention. Referring to FIG. 7, a downlink channel is received at the mobile station through an antenna 701. A descrambler 737 descrambles the received downlink channel signal with a scrambling code received from a scrambling code generator 731. The scrambling code generator 731 generates an appropriate scrambling code based on a scrambling code index 733 and a transmission mode signal 735 received from a controller 750. The scrambling code generator 731 generates a primary scrambling code continuously to receive a common channel signal from a base station. In case the base station uses a secondary scrambling code for a downlink dedicated channel, the scrambling code generator 731 generates the primary scrambling code and the secondary scrambling code at the same time. When the mobile station transmits in a compressed transmission mode and the base station transmits a downlink channel alternately between normal and compressed transmission modes, the scrambling code generator 731 alternately generates required scrambling codes. These scrambling codes can be generated at the same time by configuring the scrambling code generator 731 in the structure shown in FIG. 6 and using the scrambling code layout shown in FIG. 3. The scrambling code index 733 is equal to the scrambling code index 413 shown in FIG. 4 and used to set an initial value. The transmission mode signal 735 provides information about the type and number of scrambling code necessary to receive the downlink channel signal and information about an OVSF code necessary to despread an input frame.

A despreader 703 despreads the descrambled signal with a modification to an OVSF code in use according to the transmission mode signal 735. If the transmission mode signal 735 indicates a compressed transmission mode, the despreader 703 despreads the received downlink data with an OVSF with a half SF of the OVSF used in a normal transmission mode, that is, the root of the normal mode OVSF code in an OVSF code generation tree. The despread signal is recovered to user data through a channel estimator 705, a multiplexer 707, a deinterleaver 709, and a decoder 711.

Figure 8:
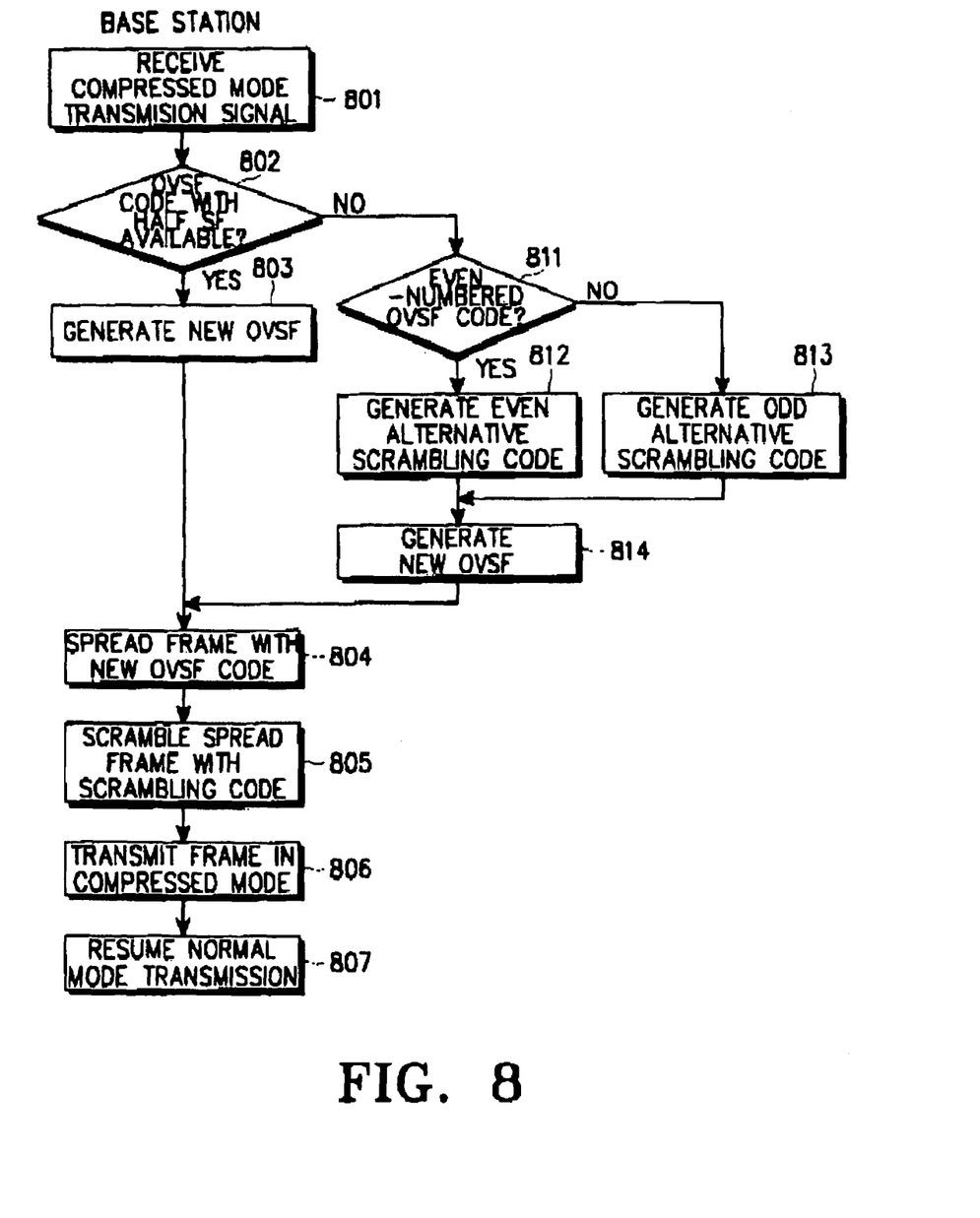
FIG. 8 is a flowchart illustrating the operation of the transmitting device shown in FIG. 4.

FIG. 8 is a flowchart illustrating the operation of the base station according to the embodiment of the present invention.

Referring to FIG. 8, the controller 420 of the base station receives a compressed mode transmission command from an upper layer in step 801. The upper layer signal is transmitted when the mobile station is about to implement an inter-frequency hard handoff. In step 802, the controller 420 determines whether an OVSF code with a half of the SF of the OVSF code currently used is available. The availability decision is made by obtaining the OVSF code with the half SF and checking whether there is any other mobile stations using an OVSF code with the same SF as that of the current OVSF code.

If the OVSF code with the half SF is available, the controller 420 generates the OVSF code with the half SF in step 803. On the contrary, if it is not available, the controller 420 proceeds to step 811. Steps 811 to 814 are performed to allow the OVSF code with the half SF to be used by modifying the current scrambling code. In step 811, the controller 420 checks whether the mobile station currently uses an even-numbered or odd-numbered OVSF code in the normal transmission mode. In the case of an even-numbered OVSF code, the controller 420 designates an even alternative scrambling code set and generates an even alternative scrambling code matched with the scrambling code used for the normal transmission mode in step 812. On the other hand, in the case of an odd-numbered OVSF code, the controller 420 designates an odd alternative scrambling code set and generates an odd alternative scrambling code matched with the scrambling code used for the normal transmission mode in step 813. The controller 420 replaces the OVSF code for the normal transmission mode by the newly generated OVSF code (half SF OVSF code) in step 814. The even alternative scrambling code or the odd alternative scrambling code are generated by shifting the current scrambling code used in the normal transmission mode once or twice, respectively referring to the scrambling code layout of FIG. 3.

In step 804, the controller 420 controls the spreader 401 to spread a frame to be transmitted in the compressed transmission mode with the new OVSF code generated in step 803 or 814. The controller 420 controls the multiplier 417 to scramble the spread signal with the current scrambling code or the newly generated even or odd alternative scrambling code in step 805. The choice between the current scrambling code and the even or odd alternative scrambling code is made in step 802. The decision is made in step 811 as to whether the even alternative scrambling code or the odd alternative scrambling code is to be selected. The scrambled frame is transmitted to the mobile station in step 806 and the normal transmission mode resumes in step 807.

Figure 9:
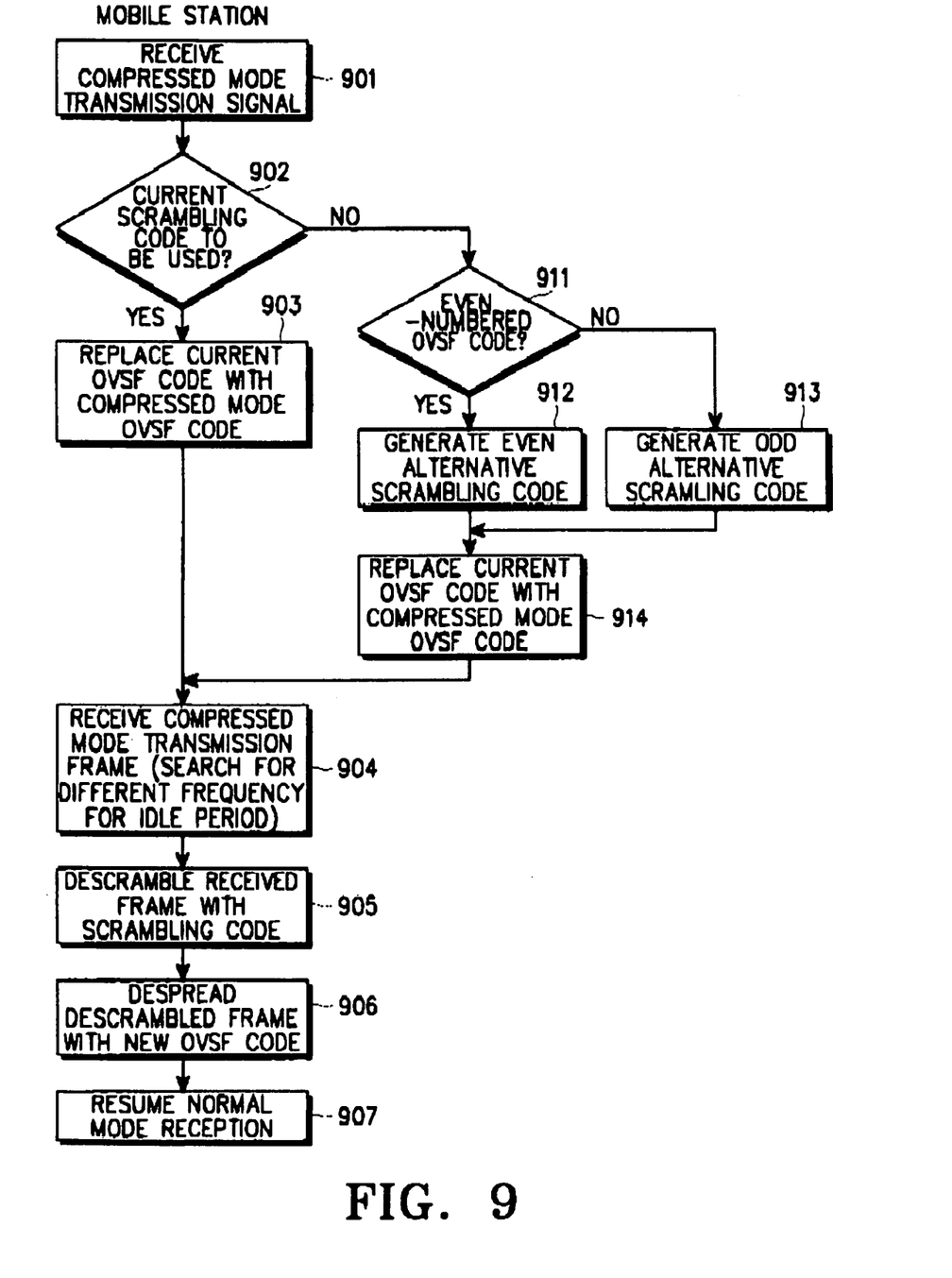
FIG. 9 is a flowchart illustrating the operation of the receiving device shown in FIG. 7.

FIG. 9 is a flowchart illustrating the operation of the mobile station according to the embodiment of the present invention.

Referring to FIG. 9, the controller 750 of the mobile station checks whether a compressed mode frame receipt message for inter-frequency handoff has been received from an upper layer in step 901 and whether a message indicating which scrambling code is to be used (hereinafter referred to as a scrambling code assignment message) has been received from the base station in step 902. Upon receipt of the scrambling code assignment message, the controller 750 determines whether the message indicates that the current scrambling code for normal mode transmission will be used. If the current scrambling code is to be used, the controller 750 replaces an OVSF code used to despread the current downlink channel by an OVSF code used to despread a compressed mode frame in step 903.

On the other hand, if the scrambling code assignment message indicates that a different scrambling code will be used for the compressed transmission mode, the controller 750 determines whether the current OCSF code is even-numbered or odd-numbered in step 911. In the case of an even-numbered OVSF code, the controller 750 proceeds to step 912 and in the case of an odd-numbered OVSF code, it goes to step 913. The controller 750 designates an even alternative scrambling code set and generates an even alternative scrambling code matched with the scrambling code used in the normal mode in step 912. In step 913, the controller 750 designates an odd alternative scrambling code set and generates an odd alternative scrambling code matched with the scrambling code used in the normal mode. The even alternative scrambling code and the odd alternative scrambling code are generated by shifting the current scrambling code used in the normal transmission mode once and twice, respectively with reference to the scrambling code layout of FIG. 3.

In step 914, the controller 750 replaces the OVSF code used to despread the current downlink channel by the OVSF code used to despread a compressed mode frame. This step is the same as step 903.

The mobile station receives a compressed mode frame in step 904 and the descrambler 737 descrambles the frame with the same scrambling code that is used in the base station in step 905. The scrambling code is a normal mode scrambling code or a compressed mode scrambling code. The base station determines whether a normal mode scrambling code or a compressed mode scrambling code is used and notifies the mobile station of the determination result. The mobile station despreads the descrambled frame with the new OVSF code generated in step 903 or 914 at the despreader 703 and recovers user data by subjecting the despread frame to channel estimation, multiplexing, deinterleaving, and decoding through the channel estimator 705, the multiplexer 707, the deinterleaver 709, and the decoder 711 in step 906 and then returns to a normal reception mode in step 907.

If the conventional scrambling code layout shown in FIG. 2 is used, the base station and the mobile station that are communicating in a normal transmission mode should generate an even alternative scrambling code by shifting the current scrambling code 8192 times used for normal mode transmission or an odd alternative scrambling code by shifting the current scrambling code 16384 times in order to commence communication in the compressed transmission mode. To generate the even alternative scrambling code, a scrambling code generator for generating a normal mode scrambling code must receive a separate initial value resulting from shifting an initial value of the normal mode scrambling code 8192 times, or an even alternative scrambling code generator should be procured separately. To generate the odd alternative scrambling code, the scrambling code generator for generating a normal mode scrambling code should receive a separate initial value resulting from shifting the initial value 16384 times of the normal mode scrambling code, or an odd alternative scrambling code generator should be procured separately.

Meanwhile, if the scrambling code layout shown in FIG. 3 is applied to the scrambling code generator shown in FIG. 6, once an initial value has been set, the scrambling code generator can generate 6 normal mode scrambling codes and 12 compressed mode scrambling codes without any additional operation. Although a base station based on the 3GPP standards is assigned to a total of 48 scrambling codes, interference between scrambling codes is increased as the base station uses more scrambling codes. Therefore, the number of scrambling codes available in reality is limited in the base station. The number of scrambling codes available to the base station in reality are estimated to be 18, the same number of scrambling codes that can be generated simultaneously in the scrambling code generator shown in FIG. 6. Consequently, all the scrambling codes available to the base station in reality can be generated concurrently from a set initial value by using the scrambling code generator of FIG. 6 and the scrambling code layout of FIG. 3. While the initial value must be re-input to generate a compressed mode scrambling code or a separate scrambling code generator is required in the conventional technology, all scrambling codes can be generated with the initial value without changing the initial value in the present invention. Thus, hardware complexity is reduced.

In accordance with the present invention as described above, scrambling codes are numbered with sequential indexes in the following order: a primary scrambling code, an even alternative scrambling code matched with the primary scrambling code, and an odd alternative scrambling code matched with the primary scrambling code. Accordingly, once an initial value has been set, scrambling codes necessary for a normal transmission mode and a compressed transmission mode can be generated at the same time.

Furthermore, when a normal mode scrambling code and a compressed mode scrambling code are alternately used, there is no need for a separate scrambling code generator that would be required if the initial value were changed to generate the compressed mode scrambling code. Therefore, hardware complexity is decreased.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A scrambling code generating apparatus for generating a primary scrambling code and a compressed mode scrambling code for compressed mode transmission in a base station device, the apparatus comprising:
   a first feedback linear shift register for generating an m-sequence from first predetermined initial bits;
   a second feedback linear shift register for generating another m-sequence from second predetermined initial bits;
   a first adder for generating the primary mode scrambling code by adding the outputs of the first and second linear feedback shift registers;
   a second adder for adding the output of the second linear feedback register and an m-sequence one bit delayed from the output of the first linear feedback register; and
   a third adder for adding the output of the second linear feedback register and an m-sequence two bits delayed from the output of the first linear feedback register;
   wherein the compressed mode scrambling code is one of the outputs of the second and third adders.

2. The scrambling code generating apparatus of claim 1, wherein the compressed mode scrambling code is selected for compressed mode transmission during inter-frequency handoff in the base station, wherein the second adder generates an even alternative compressed mode scrambling code and the third adder generates an odd alternative compressed mode scrambling code to be used in the compressed transmission mode using an identical value in a mobile communication system, the compressed mode scrambling code used being selected by a selector, said selector:
   determining whether an OVSF code with a half of the SF of a current OVSF code is available;
   determining whether the current OVSF code is even-numbered or odd-numbered if the OVSF code is not available; and
   selecting the even alternative scrambling code if the current OVSF code is even-numbered and selecting the odd alternative scrambling code if the current OVSF code is odd-numbered.

3. A scrambling code generating apparatus for generating a primary scrambling code and a compressed mode scrambling code for compressed mode transmission in a mobile station device, the apparatus comprising:
   a first feedback linear shift register for generating an m-sequence from first predetermined initial bits;
   a second feedback linear shift register for generating another m-sequence from second predetermined initial bits;
   a first adder for generating the primary scrambling code by adding the outputs of the first and second linear feedback shift registers;
   a second adder for adding the output of the second linear feedback register and an m-sequence one bit delayed from the output of the first linear feedback register; and
   a third adder for adding the output of the second linear feedback register and an m-sequence two bits delayed from the output of the first linear feedback register;
   wherein the compressed mode scrambling code is one of the outputs of the second and third adders and the primary scrambling code and the compressed mode scrambling code are simultaneously generated.

4. The scrambling code generating apparatus of claim 3, wherein the compressed mode scrambling code is selected for compressed mode transmission during inter-frequency handoff in the mobile station, wherein the second adder generates an even alternative compressed mode scrambling code and the third adder generates an odd alternative compressed mode scrambling code to be used in the compressed transmission mode using an identical value in a mobile communication system, the compressed mode scrambling code used being selected by a selector, said selector:
   determining whether a scrambling code assignment message designates a current scrambling code upon receipt of the scrambling code assignment message;
   determining whether a current OVSF code is even-numbered or odd-numbered if the scrambling code assignment message code does not designate the current scrambling code; and
   selecting the even alternative scrambling code if the current OVSF code is even-numbered and selecting the odd alternative scrambling code if the current OVSF code is odd-numbered.

5. A scrambling code generating method for generating a primary scrambling code and a compressed mode scrambling code for compressed mode transmission in a base station device having a spreader for spreading an input data sequence with one of a plurality of OVSF codes and a scrambler for scrambling the spread data sequence with the primary scrambling code used as a default and the compressed mode scrambling code, the method comprising the steps of:
   generating a first m-sequence from first predetermined initial bits;
   generating a second m-sequence from second predetermined initial bits;
   generating the primary scrambling code for normal mode transmission by adding the first and second m-sequences;
   generating a first compressed mode scrambling code by adding the second m-sequence and an m-sequence one bit delayed from the first m-sequence; and
   generating a second compressed mode scrambling code by adding the second m-sequence and an m-sequence two bits delayed from the first m-sequence;
   wherein the compressed mode scrambling code is one of the first and second compressed mode scrambling codes and is provided to the scrambler to scramble the spread data sequence.

6. A scrambling code generating method for generating a primary scrambling code and a first and second compressed mode scrambling code for compressed mode transmission in a mobile station device having a descrambler for descrambling an input data sequence with the primary scrambling code used as a default and a despreader for despreading the descrambled data with one of a plurality of OVSF codes, the method comprising the steps of:
   generating a first m-sequence from first predetermined initial bits;
   generating a second m-sequence from second predetermined initial bits;
   generating the primary scrambling code for normal mode transmission by adding the first and second m-sequences;
   generating the first compressed mode scrambling code by adding the second m-sequence and an m-sequence one bit delayed from the first m-sequence; and
   generating the second compressed mode scrambling code by adding the second m-sequence and an m-sequence two bits delayed from the first m-sequence;

wherein one of the first and second compressed mode scrambling codes is provided to the descrambler to descramble the input data sequence.

7. A scrambling code assigning method for compressed mode transmission during inter-frequency handoff in a base station having a scrambling code generating apparatus that can generate a scrambling code to be used in a normal transmission mode and even or odd alternative scrambling codes to be used in a compressed transmission mode, the method comprising the steps of:

selecting an OVSF code with a half of the spreading factor (SF) of a current OVSF code, if the OVSF code with the half of the SF of the current OVSF code is available; and selecting one of an even alternative scrambling code and an odd alternative scrambling code depending on whether the current OVSF code is even-numbered or odd-numbered, if the OVSF code with the half of the SF of the current OVSF code is not available.

8. The scrambling code assigning method of claim 7, wherein the current OVSF code is assigned to a dedicated channel for a mobile station by the base station.

9. The scrambling code assigning method of claim 7, wherein the even-numbered OVSF code exists on an even-numbered branch of an OVSF code tree.

10. A scrambling code assigning method for compressed mode transmission during inter-frequency handoff in a mobile station having a scrambling code generating apparatus that can generate a scrambling code to be used in a normal transmission mode and even or odd alternative scrambling codes to be used in a compressed transmission mode, the method comprising the steps of:

selecting a scrambling code in accordance with a scrambling code assignment message, if said scrambling code assignment message is received, wherein the scrambling code assignment message includes information about a currently used scrambling code; and selecting one of an even alternative scrambling code and an odd alternative scrambling code depending on whether a current OVSF code is even-numbered or odd-numbered, if the scrambling code assignment message code is not received.

11. The scrambling code assigning method of claim 10, wherein the current OVSF code is assigned to a dedicated channel for a mobile station by the base station.

12. The scrambling code assigning method of claim 10, wherein the even-numbered OVSF code exists on an even-numbered branch of an OVSF code tree.

\* \* \* \* \*